United States Patent Office 3,772,259
Patented Nov. 13, 1973

3,772,259
2-VINYL-1-CYCLOAMIDINEPROPIONAMIDE POLYMERS
Laurence Lyman Williams, Stamford, and Anthony Thomas Coscia, Norwalk, Conn., assignors to American Cyanamid Company, Stamford, Conn.
No Drawing. Continuation-in-part of abandoned application Ser. No. 471,463, July 12, 1965, which is a continuation-in-part of application Ser. No. 745,485, July 17, 1968, now Patent No. 3,556,932. This application Jan. 18, 1971, Ser. No. 107,586
Int. Cl. C08f 3/76, 3/90; D21h 3/38
U.S. Cl. 260—88.7 R             4 Claims

ABSTRACT OF THE DISCLOSURE

Water-soluble cationic substantially linear polymers which consist essentially of 2-vinyl-1-cycloamidine-propionamide linkages are effective flocculants for solids suspended in aqueous state. When carrying a sufficient number of glyoxal substituents to be thermosetting, the polymers are wet-strengthening agents for paper. Wet strength paper made by use of this polymer loses about half of its wet strength on normal wet weathering, thus alleviating the litter problem.

---

This is a continuation-in-part of our copending application Ser. No. 471,463, filed July 12, 1965, now abandoned and our copending Ser. No. 745,485, filed on July 17, 1968, now U.S. Pat. No. 3,556,932.

The present invention relates to new cationic hydrophilic vinylamide polymers and to such polymers carrying a sufficient proportion of glyoxal substituents to be thermosetting, to processes for the manufacture of said polymers without and with glyoxal, to paper of improved wet and dry strength resulting from a content of said glyoxalated polymers in thermoset state, and to methods for pulping said paper.

The discovery has now been made that the water-soluble cationic substantially linear polymer which consists essentially of 2-vinyl-1-cycloamidinepropionamide linkages which carry a sufficient number of glyoxal substituents so that the polymer is thermosetting is an excellent wet-strength resin for use in the manufacture of paper. In addition we have found that the polymer in unglyoxalated state is an effective flocculant for solids suspended in aqueous medium such as mine effluent water, turbid river water and sewage, and that the polymer is an effective dewatering agent for digested sewage sludge.

The polymer of the present invention (hereinafter termed "polyvinylcycloamidinepropionamide") is essentially composed of linkages of the theoretical formula:

(1) 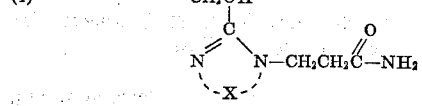

wherein X represents a C$_{2-3}$ alkylene linkage.

Preferred polymers are poly(2-vinyl-1-imidazolinepropionamide) and poly(2-vinyl-1-tetrahydropyrimidinepropionamide), corresponding to polymers wherein X represents a C$_2$ and a C$_3$ alkylene respectively.

The invention includes the foregoing polymer in glyoxalated state, i.e., the state in which it carries glyoxal substituents having the theoretical formula:

(2)             —CHOHCHO

The glyoxal substituents at least in part are attached to the propionamide units, so that in glyoxalated state these units have the theoretical formula:

(3)

$$-CH_2CH_2\overset{O}{\underset{}{C}}-NHCHOHCHO$$

(3)

When glyoxal substituents are present, their number is such as to render the polymer thermosetting.

The polymer of the present invention, in preferred embodiments, has the following advantages.

(1) It is readily prepared. A suitable starting polymer can be readily prepared from commercially available and inexpensive raw materials, and a polymer of the present invention can be prepared therefrom merely by a mix-and-heat reaction. Glyoxalation of the polymer is performed in an equally simple manner.

(2) The polymer has a large number of glyoxal-reactive sites. As a result, the polymer thermosets more readily than polymers wherein some of the linkages are nonreactive towards glyoxal.

(3) The linkages of the polymer possess specifically different reactivities for glyoxal. Glyoxal reacts preferentially with the carboxamide substituents and so does not tend to mask the cationic activity of either of the nitrogen atoms of the cycloamidine rings.

(4) The wet strength imparted by the glyoxalated polymer is temporary. Approximately half of the wet strength of paper having a content of the polymer in glyoxalated thermoset state disappears when the paper is soaked in water at room temperature for 24 hours. For some purposes (e.g., towelling, napkins and "personal" tissues) permanent wet strength is unnecessary and in fact is a positive disadvantage. The present invention provides a polymer which provides a paper which loses a large part of its strength on normal wet weathering, and to this extent alleviates the national litter problem.

The polymers of the present invention are conveniently prepared by reacting a water-soluble poly-2-vinylcycloamidine (hereinafter termed the "starting" polymer) having the theoretical formula:

(3) 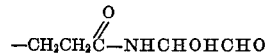

wherein X represents a C$_{2-3}$ alkylene radical, for example, ethylene and trimethylene, with acrylamide according to the theoretical equation:

(4)

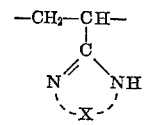 + 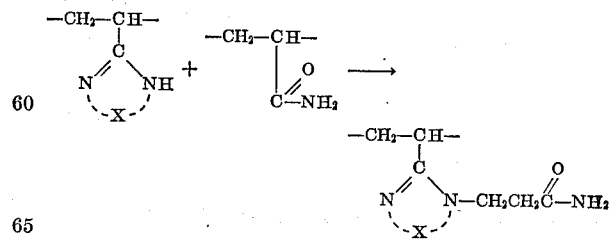

We prefer that the polymer be wholly composed of the cycloamidinepropionamide linkages shown, as in such event the polymer generally possesses best wet strengthening properties. If desired, however, the polymer may contain other linkages which do not alter its essential character. Thus the polymer may contain cycloamidine linkages which have not been reacted with acrylamide, residual acrylonitrile linkages, methyl vinyl ether linkages, methyl vinyl pyridine linkages, cyclized dialkyl dimethyl ammonium chloride linkages, and those derived from 1-olefins such as isobutylene.

However, in instances where the polymer is made by the method just described, it is unnecessary for every cycloamidine substituent to be reacted with acrylamide. A very satisfactory polymer is produced when as few as 25% of the cycloamidine substituents of the starting polymer are reacted with acrylamide. Accordingly, polymers consisting essentially of cycloamidinepropionamide linkages and cycloamidine linkages between 50:50 and 80:20 molar ratio are within the preferred scope of the present invention.

The foregoing polymers are effective flocculants for suspended solids in aqueous medium, for example, turbid river water, mine effluent water, and sewage. They are added in an amount equal to between 0.1 to 10 parts per million based on the total weight of the sewage. They are also effective for dewatering digested sewage sludge and are added in appropriate amount depending upon the consistency, pH and character of the sludge.

When reacted with sufficient glyoxal to be thermosetting the polymer is an effective wet strengthening agent for paper. The minimum number of glyoxal substituents which need to be present for this purpose has not been determined, but a suitable amount can be readily determined in any instance by laboratory trial. As little as 0.05 mol of glyoxal per propionamide substituent appears to be about the least amount which is effective for the purpose. We prefer to have a much larger amount present, in the range of $1/10$ to $1/2$ or $3/4$ mol per mol of propionamide substituents, as in this range the polymer possesses very good wet strengthening properties and over-use of glyoxal is avoided.

The polyvinylcycloamidinepropionamide of the present invention in non-glyoxalated state is conveniently prepared by dissolving the desired quantity of the desired starting polymer [for example poly(2-vinylimidazoline)] and the desired proportion of acrylamide in a hot water containing butanol as solution aid, and keeping the solution hot. The reaction proceeds rapidly. The desired polymer can be recovered by pouring the solution into a large volume of acetone. The polymer precipitates, usually as a powder. It is soluble in water and is more easily soluble in acidulated water.

The polyvinylcycloamidinepropionamide can be glyoxalated by adding glyoxal in appropriate amount to a 20% by weight solution of the condensation product in warm water at pH 8–9. Only about half of the glyoxal reacts, and the reaction is considered terminated after about two hours (i.e., when the solution has substantially increased in viscosity but is short of the point at which it forms a water-insoluble gel). In this range the polymer is water-soluble and thermosetting.

If preferred, the glyoxal may be added to the solution of the reaction product referred to above after stripping off the butanol.

Not all the glyoxal which is added reacts with the polymer. Evidently only about one-half does so, the remainder staying in solution. When the polymer is used for the manufacture of paper by the beater addition method, the unreacted glyoxal remains in the white water.

The polymer produces its strengthening effect both by reacting with itself, whereby a cross-linked polymeric network is formed on the papermaking fibers, and with the cellulose, forming acetal linkages therewith.

When used as a flocculant, the polymer is added (preferably in non-glyoxalated state) as a dilute solution to the suspension to be treated. Flocculation of the suspended solids begins at once. The clumps settle rapidly, leaving a clear aqueous phase. Sufficient of the solution is added to supply 0.5 to 10 parts by weight of the polymer per million part of the total weight of the suspension.

When used for the manufacture of paper, an aqueous solution of the polymer in glyoxalated thermosetting state is added to an aqueous suspension of cellulose or other anionic paper-making fibers at pH of 4 to 8 at a sufficient rate to provide an effective wet-strengthening amount of the polymer. Generally an amount between 0.1% and 3% based on the dry weight of the fibers is sufficient for the purpose. The polymer is advantageously added at a point near the wire, for example, at the fan pump or head box. The wet strengthening action of the polymer develops both when the web is dried at room temperature and when the wet web is dried as is customary on rolls having a surface temperature between 190° and 250° F.

If preferred, the polymer may be applied by size press. According to this method a solution containing sufficient of the polymer at pH 4 to 8 is prepared so that the paper receives an effective amount of the polymer for wet-strengthening purposes. Thereafter, the paper is dried as has been described.

The term "thermosetting" as used herein means that the polymer becomes water-insoluble when heated for the time and at the temperature typically employed in the present-day high speed drying of paper, e.g., five seconds at 240° F.

Polymers of the present invention carrying a sufficient proportion of glyoxal substituents to be thermosetting are claimed in our copending application Ser. No. 359,350, filed on May 11, 1973.

The invention is more particularly illustrated by the examples which follow. These examples are preferred embodiments of the invention and are not to be construed in limitation thereof.

EXAMPLE 1

The following illustrates the preparation of poly-2-vinyl-1-imidazolinepropionamide.

A solution of 15.0 g. (0.16 mol) of poly(2-vinyl-imidazoline) (prepared by reacting polyacrylonitrile with ethylenediamine), 14.2 g. (0.20 mol) of acrylamide, and 50 ml. of n-butanol is maintained at 95° C. for five hours. The solution is then cooled and poured into 600 ml. of acetone at room temperature with stirring. The polymer precipitates and is filtered off. The recovered polymer is intensively agitated with 100 cc. of acetone in a Waring blender, recovered by filtration and allowed to dry. On evaporation of the acetone 20.8 g. of a finely-divided tan solid are recovered. The polymer is substantially composed of 2-vinyl-1-imidazolinepropionamide linkages. It is water-soluble and cationic.

EXAMPLE 2

The following illustrates the preparation of a polymer substantially composed of 2-vinylimidazoline and 2-vinyl-1-imidazolinepropionamide linkages.

The procedure of Example 1 is repeated except that the amount of acrylamide is decreased to 7.1 g. (0.10 mol). The product is substantially composed of the above linkages in about 100:62 molar ratio.

EXAMPLE 3

The following illustrates the conversion of the polymer of Example 1 into glyoxalated thermosetting form.

To a solution of 4.0 g. of the polymer in 15 cc. of water is added 1.5 g. of solid $NaH_2PO_4 \cdot H_2O$ and 1.7 g. of glyoxal in 18.3 g. of water. The pH of the solution is adjusted to pH 7.8 and is heated at 40° C. for 70 minutes, at which point the Gardner-Holdt viscosity of the solution is P.

The solution is cooled to room temperature, adjusted to pH 2 and diluted to 10% solids by addition of water. The resulting polymer thermosets to insoluble state when filter paper is saturated with a 0.5% solution of the polymer at pH 6 and the paper is dried at 100° C. The paper possesses good wet strength.

EXAMPLE 4

The glyoxalation procedure of Example 3 is repeated except that the polymer of Example 2 is used in place of the polymer of Example 1. A similar thermosetting polymer is obtained.

EXAMPLE 5

The following illustrates the preparation of a water-soluble cationic poly(2 - vinyl - 1-tetrahydropyrimidine-propionamide).

The procedure of Example 1 is repeated, except that 16.5 g. (0.115 mol) of poly(2-vinyl-1-tetrahydropyrimidine) is used in place of the poly (2-vinylimidazoline) used in Example 1. A closely similar polymer is obtained.

EXAMPLE 6

The following illustrates the conversion of the polymer of Example 5 into glyoxalated thermosetting form.

The process of Example 3 is repeated except that 4.0 g. of the polymer of Example 5 is employed in place of the polymer of Example 1.

Results are substantially the same.

EXAMPLE 7

The following illustrates the preparation of wet strength paper according to the present invention.

To an aqueous suspension of well-beaten 50:50 bleached hardwood: bleached softwood papermaking fibers having a consistency of 0.6% is added one of the polymer solutions shown in the table below. The suspension is adjusted to pH 7.0 and briefly stirred to allow the fibers to complete their adsorption of the polymer. The suspension is then processed into handsheets of 70 lb. basis weight (25″ x 40″/500 ream). The sheets are dried by one pass over a laboratory drum drier having a drum temperature of 240° F. The "no soak" wet strength of the sheet is then determined by clamping the sheet between the jaws of a tensile strength tester 2″ apart, rapidly wetting the sheet, and then determining the force needed to pull the sheet apart. The procedure is repeated with the other polymers shown above.

Results are as follows:

| Polymer | | | |
|---|---|---|---|
| Description [1] | Example [2] | Percent added [3] | Wet strength [4] |
| Blank — None | | | 0.7 |
| Run No.: | | | |
| 1 — PVI-AM | 1 | 0.25 | 0.8 |
| 2 — | | 0.50 | 0.8 |
| 3 — PVI-AM-glyoxal | 2 | 0.25 | 3.0 |
| 4 — | | 0.50 | 3.6 |
| 5 — PVTHP-AM | 3 | 0.25 | 0.8 |
| 6 — | | 0.50 | 0.8 |
| 7 — PVTHP-AM-glyoxal | 4 | 0.25 | 3.0 |
| 8 — | | 0.50 | 3.5 |

[1] PVI=poly-2-vinylimidazoline. PVTHP=poly-2-vinyl tetrahydropyrimidine. AM=Acrylamide.
[2] Example (see text above).
[3] Polymer (with glyoxal if present) based on dry weight of fibers.
[4] Lb./in. by "no soak" method (see text above).

The paper described above loses about half of its wet strength when soaked in water for 24 hours at room temperature and loses nearly all its wet strength when soaked in water having a pH of 9 or higher. The resulting paper is reduced to a pulp when subjected to mechanical pulping, i.e., passage through a beater.

We claim:
1. A water-soluble cationic substantially linear polymer consisting essentially of 2-vinyl-1-cycloamidinepropionamide linkages.
2. A water-soluble cationic substantially linear polymer consisting essentially of 2-vinyl-1-cycloamidinepropionamide linkages and 2-vinylcycloamidine linkages in molar ratio larger than 80:20.
3. A polymer according to claim 2 wherein the linkages are respectively 2-vinyl-1-imidazolinepropionamide and 2-vinyl-1-imidazoline linkages.
4. A polymer according to claim 2 wherein the linkages are 2-vinyltetrahydropyrimidine and 2-vinyl-1-tetrahydropyrimidinepropionamide linkages.

References Cited
UNITED STATES PATENTS

| | | | |
|---|---|---|---|
| 3,557,061 | 1/1971 | Hamann | 260—86.1 R |
| 3,210,371 | 10/1965 | Sawa et al. | 260—88.7 B |
| 3,288,707 | 11/1966 | Hurtwitz et al. | 260—88.7 B |
| 3,300,406 | 1/1967 | Pollio | 260—88.7 B |
| 3,376,159 | 4/1968 | Drennen et al. | 260—88.7 B |
| 3,488,294 | 1/1970 | Annand et al. | 260—88.7 B |
| 3,406,139 | 10/1968 | Hurtwitz et al. | 260—88.7 B |
| 3,515,707 | 6/1970 | Reimschuessel et al. | 260—88.7 R |
| 3,527,719 | 8/1970 | Hurtwitz et al. | 260—88.7 B |

HARRY WONG, Jr., Primary Examiner

U.S. Cl. X.R.
162—168

UNITED STATES PATENT OFFICE
CERTIFICATE OF CORRECTION

Patent No. 3,772,259     Dated November 13, 1973

Inventor(s) LAURENCE LYMAN WILLIAMS and ANTHONY THOMAS COSCIA

It is certified that error appears in the above-identified patent and that said Letters Patent are hereby corrected as shown below:

Column 1 line 64. Between "alkylene" and "respectively" insert -- linkage --.

Signed and sealed this 9th day of April 1974.

(SEAL)
Attest:

EDWARD M. FLETCHER, JR.
Attesting Officer

C. MARSHALL DANN
Commissioner of Patents